(12) United States Patent
Lee et al.

(10) Patent No.: US 8,339,480 B2
(45) Date of Patent: Dec. 25, 2012

(54) MOBILE TERMINAL WITH IMAGE MAGNIFICATION AND IMAGE MAGNIFICATION CONTROLLING METHOD OF A MOBILE TERMINAL

(75) Inventors: Dong Hoon Lee, Gyeonggi-do (KR); Kyoo Sung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 12/779,913

(22) Filed: May 13, 2010

(65) Prior Publication Data

US 2010/0321536 A1    Dec. 23, 2010

(30) Foreign Application Priority Data

Jun. 23, 2009    (KR) .................. 10-2009-0055748

(51) Int. Cl.
*H04N 5/262* (2006.01)
(52) U.S. Cl. .................................... 348/240.99
(58) Field of Classification Search .............. 348/240.99
See application file for complete search history.

(56) References Cited

U.S. PATENT DOCUMENTS

| | | | |
|---|---|---|---|
| 6,803,931 B1 * | 10/2004 | Roman et al. ................. | 715/800 |
| 7,154,544 B2 * | 12/2006 | Kowno et al. ............ | 348/240.99 |
| 2002/0048413 A1 | 4/2002 | Kusunoki | |
| 2002/0191866 A1 * | 12/2002 | Tanabe ......................... | 382/298 |
| 2004/0239686 A1 | 12/2004 | Koyama et al. | |
| 2005/0025221 A1 * | 2/2005 | Lindsey et al. ............... | 375/140 |
| 2005/0028221 A1 * | 2/2005 | Liu et al. ........................ | 725/133 |
| 2005/0083350 A1 | 4/2005 | Battles | |
| 2007/0140675 A1 | 6/2007 | Yanagi | |
| 2008/0055429 A1 | 3/2008 | Yoshida | |
| 2008/0291284 A1 | 11/2008 | Robsarve | |
| 2009/0041384 A1 * | 2/2009 | Jang .............................. | 382/298 |
| 2009/0059030 A1 * | 3/2009 | Hoshii ....................... | 348/222.1 |
| 2009/0207310 A1 * | 8/2009 | Arai .............................. | 348/581 |

* cited by examiner

*Primary Examiner* — Usman Khan
(74) *Attorney, Agent, or Firm* — Lee, Hong, Degerman, Kang & Waimey

(57) ABSTRACT

A mobile terminal and method of controlling a mobile terminal are provided. While a preview image is displayed on a screen and a camera zooms in, a zoom-in region is stored after being cropped from the preview image. According to the present invention, when an image resulting from zooming in a preview image is photographed and stored, the region corresponding to the zoomed-in image is cropped from the preview image and then stored instead of the zoomed-in image with a resolution size of the preview image being stored. Therefore, the present invention reduces a size of a stored image without degradation of a picture, thereby increasing an available size of the memory.

16 Claims, 15 Drawing Sheets

FIG. 9
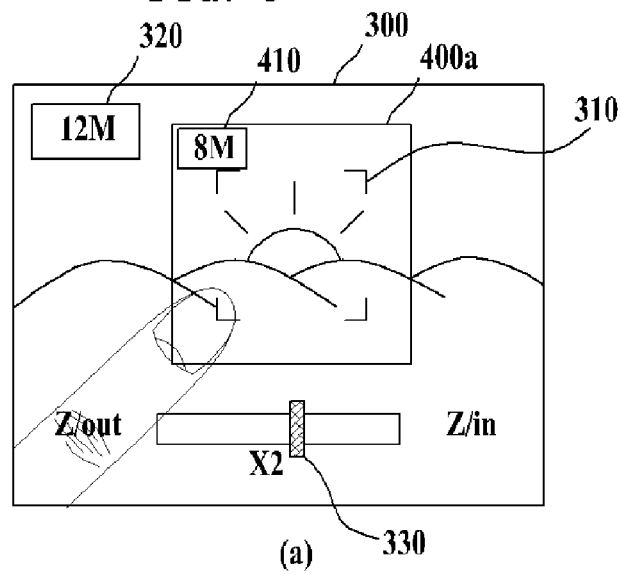
(a)
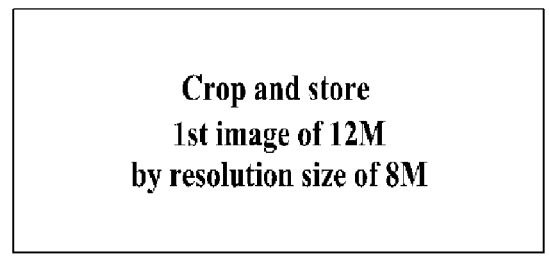
Crop and store
1st image of 12M
by resolution size of 8M
(b)
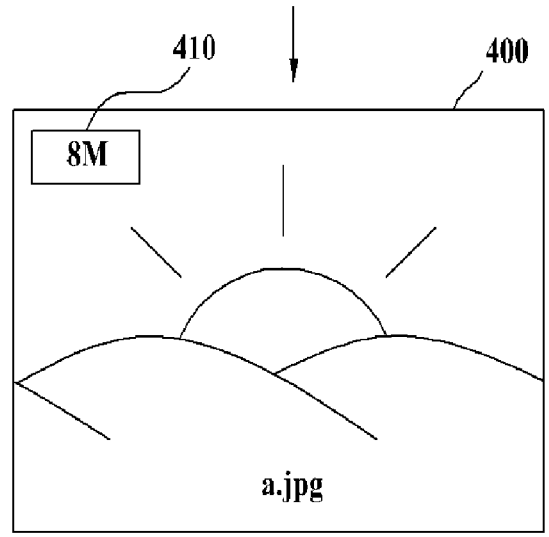
(c)

MOBILE TERMINAL WITH IMAGE MAGNIFICATION AND IMAGE MAGNIFICATION CONTROLLING METHOD OF A MOBILE TERMINAL

Pursuant to U.S.C. §119(a), this application claims the benefit of earlier filing date and right of priority to Korean Application No. 10-2009-0055748, filed on Jun. 23, 2009, the contents of which are hereby incorporated by reference herein in their entirety.

BACKGROUND OF THE INVENTION

1. Field of the Invention

The present invention relates to a mobile terminal, and more particularly, to a mobile terminal and method of controlling a mobile terminal. Although the present invention is suitable for a wide scope of applications, it is particularly suitable for facilitating a user to use a terminal in consideration of the user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. Mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal having a camera equipped with a digital zoom function has been released. Specifically, the mobile terminal is able to take a picture of an object by zooming in or out on the object using the digital zoom.

However if a picture is taken using the zoom when the resolution of the camera is set to a maximum, degradation of the picture may occur. Moreover, since the picture at the maximum resolution is taken in the zoom mode, quality of the picture is not good.

In order to solve the above problems, a user must crop a specific portion of the picture after the picture has been taken with the maximum resolution, thereby requiring inconvenient use of an external personal computer or other device. Furthermore, since an image cropped from the picture is stored with the maximum resolution, memory is wasted.

SUMMARY OF THE INVENTION

In one aspect of the present invention, a mobile terminal is provided. The mobile terminal includes an input unit configured to receive commands, a camera configured to capture an image and having a zoom function with a corresponding zoom magnification, a display unit configured to display images and a control unit configured to control the display unit to display a first image input from the camera, process a command received by the input unit to change the zoom magnification applied to the first image, identify a region within the first image corresponding to a second image to which the changed zoom magnification is applied, control the display unit to display first information indicating the identified region and second information indicating a resolution size of the identified region, process a command received by the input unit to photograph the second image, and crop the second image from the first image and control the display unit to display the cropped second image.

It is contemplated that mobile terminal further includes a memory, wherein the control unit is further configured to control the memory to store the cropped second image. It is further contemplated that the control unit controls the memory to store the cropped second image having a name including information indicating that the second image is cropped from the first image.

It is contemplated that the control unit controls the memory to store the cropped second image including information indicating a resolution size of the first image and the resolution size of the cropped second image. It is further contemplated that the control unit controls the memory to store the cropped second image by inserting at least information indicating that the image is cropped from the first image, information related the zoom magnification, a resolution size of the first image or a resolution size of the cropped second image into meta information of the cropped second image.

It is contemplated that the control unit controls the memory to store the cropped second image such that the cropped second image is discriminated from previously stored non-cropped images. It is further contemplated that the memory includes a plurality of storage spaces for storing images having different resolution size and the control unit controls the memory to store the cropped second image in one of the plurality of storage spaces corresponding to a resolution size of the cropped second image.

It is contemplated that the resolution size of the cropped second image is such that an amount of memory required to store the cropped second image is less than an amount of memory that would be required to store the first image at the unchanged zoom magnification. It is further contemplated that the control unit controls the display unit to display the first information and the second information transparently within the first image.

It is contemplated that the first information is displayed having a shape indicating an outline of the identified region. It is further contemplated that the control unit is further configured to crop the second image from the first image and control the display unit to display the cropped second image in response to selection of the first information.

It is contemplated that the control unit is further configured to control the display unit to display a preview of an image of the identified region on a background of the second information. It is further contemplated that the control unit is further configured to control the display unit to display at least a zoom magnification value of the second image, a resolution size of the first image or the resolution size of the identified region in response to selection of the second information according to a first scheme.

It is contemplated that the control unit is further configured to crop the second image from the first image and control the display unit to display the cropped second image in response to selection of the second information according to a second scheme different from the first scheme. It is further contemplated that the first scheme includes a touch of the second information for a duration less than a threshold time and the second scheme includes a touch of the second information for a duration greater than the threshold time.

It is contemplated that the control unit controls the display unit to display the second information having a size according to the resolution size of the indentified region. It is further contemplated that the control unit controls the display unit to display the second information in a larger size if the resolution size of the identified region is increased and the control unit controls the display unit to display the second information in a smaller size if the resolution size of the identified region is decreased. It is further contemplated that the control unit controls display unit to display the cropped second image as a full-screen image. Preferably, the mobile terminal further includes an audio output unit, wherein the control unit is further configured to control the audio output unit to output a sound indicating the resolution size of the identified region.

In another aspect of the present invention a method of controlling a mobile terminal is provided. The method includes displaying a first image input from a camera having a zoom function with a corresponding zoom magnification, processing a received command to change the zoom magnification applied to the first image, identifying a region within the first image corresponding to a second image to which the changed zoom magnification is applied, displaying first information indicating the identified region and second information indicating a resolution size of the identified region, processing a received command to photograph the second image, cropping the second image from the first image and displaying the cropped second image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 to 15 are diagrams for configurations of a screen on which a method of controlling a mobile terminal according to the present invention is displayed.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. By-way of non-limiting example only, further description will be with regard to a mobile terminal 100, but it should be noted that such teachings may apply equally to other types of terminals.

Figure 1:
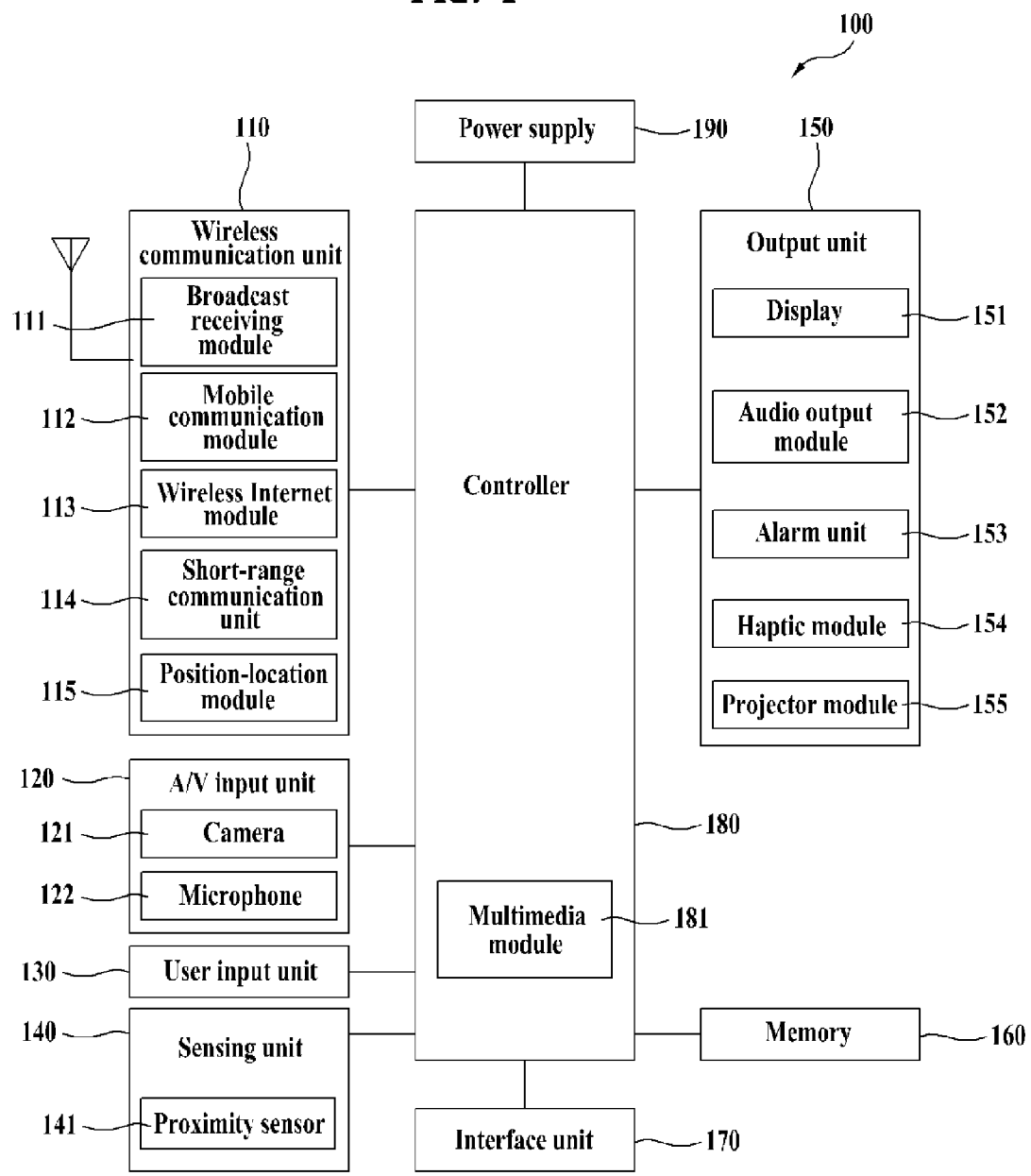
FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

For example, the wireless communication unit 110 can include a broadcast receiving module 111, a mobile communication module 112, a wireless Internet module 113, a short-range communication module 114, and a position-location module 115. At least two broadcast receiving modules 111 can be provided to facilitate simultaneous reception of at least two broadcast channels or broadcast channel switching.

The broadcast receiving module 111 receives a broadcast signal and/or broadcast associated information from an external broadcast managing server via a broadcast channel. The broadcast channel may include a satellite channel or a terrestrial channel.

The broadcast managing server refers generally to a system that transmits a broadcast signal and/or broadcast associated information or a server which is provided with a previously generated broadcast signal and/or broadcast associated information and then transmits the provided signal or information to a terminal. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T).

Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. The wireless Internet technology can include, for example, WLAN (Wireless LAN) (Wi-Fi), Wibro (Wireless broadband), Wimax (World Interoperability for Microwave Access), or HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using a global positioning system (GPS) module.

The audio/video (NV) input unit 120 is configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on the display 151. The image frames processed by the camera 121 can be stored in the memory 160 or can be externally transmitted via the wireless communication unit 110. At least two cameras 121 can be provided according to environment of usage.

The microphone 122 receives an external audio signal while the mobile terminal 100 is in a particular mode, such as phone call mode, recording mode or voice recognition mode. This audio signal is processed and converted into digital data. The processed audio data is transformed into a format transmittable to a mobile communication base station via the mobile communication module 112 in a call mode. The microphone 122 typically includes assorted noise removing algorithms to remove noise generated in the course of receiving the external audio signal.

Data generated by the NV input unit 120 may be stored in the memory 160, utilized by the output unit 150, or transmitted via one or more modules of the communication unit 110. If desired, two or more cameras 121 or microphones 122 may be provided.

The user input unit 130 generates input data responsive to user manipulation of an associated input device or devices. Examples of such devices include a keypad, a dome switch, a touchpad such as static pressure/capacitance, a jog wheel and a jog switch.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or orientation or acceleration/deceleration of the mobile terminal. The sensing unit 140 can include a proximity sensor 141.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190 or the presence or absence of a coupling or other connection between the interface unit 170 and an external device.

The output unit 150 generates outputs relevant to the senses such as sight, hearing, and touch. The output unit 150 is illustrated in FIG. 1 as having a display 151, an audio output module 152, an alarm unit 153, a haptic module 154, and a projector module 155.

The display 151 is typically implemented to visually display (output) information associated with the mobile terminal 100. For example, if the mobile terminal 100 is operating in a phone call mode, the display 151 will generally provide a user interface (UI) or graphical user interface (GUI) that includes information associated with placing, conducting, and terminating a phone call. If the mobile terminal 100 is in a video call mode or a photographing mode, the display 151 may additionally or alternatively display images which are associated with these modes, the UI or the GUI.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151.

Some of the displays 151 can be implemented as a transparent or optical transmittive type, which can be called a transparent display. The transparent display may be a TOLED (transparent OLED). A rear configuration of the display 151 can be implemented as an optical transmittive type as well. In this configuration, a user is able to see an object at the rear of the terminal body via the area occupied by the display 151.

At least two displays 151 can be provided in accordance with the implemented configuration of the mobile terminal 100. For example, a plurality of displays 151 can be arranged on a single face of the mobile terminal 100 such that they are spaced apart from each other or built in one body. Alternatively, a plurality of displays 151 can be arranged on different faces of the mobile terminal 100.

If the display 151 and a sensor for detecting a touch action (hereinafter called 'touch sensor') form a mutual layer structure such as a touch screen, the touch sensor can be configured as a touch film, a touch sheet, or a touchpad. The touch sensor can be configured to convert a pressure applied to a specific portion of the display 151 or a variation of a capacitance generated from a specific portion of the display 151 into an electric input signal. Furthermore, the touch sensor may be configured to detect a pressure of a touch as well as a touched position or size.

If a touch input is made to the touch sensor, signal(s) corresponding to the touch are transferred to a touch controller (not shown). The touch controller processes the signal(s) and then transfers the processed signal(s) to the controller 180. The controller 180 is able to determine whether a specific portion of the display 151 is touched.

The proximity sensor 141 can be provided at an internal area of the mobile terminal 100 enclosed by the touch screen or around the touch screen. The proximity sensor is a sensor that detects a presence or non-presence of an object approaching a specific detecting surface or an object existing around the proximity sensor using an electromagnetic field strength or infrared ray without mechanical contact. Therefore, the proximity sensor is more durable than a contact type sensor and also provides wider utility than a contact type sensor.

The proximity sensor may include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor or similar sensors. If the touch screen includes an electrostatic capacity proximity sensor, it is configured to detect the proximity of a pointer using a variation of electric field according to the proximity of the pointer. In this case, the touch screen (touch sensor) can be classified as the proximity sensor.

In the following description, an action where a pointer that approaches without contacting the touch screen is recognized as located on the touch screen is called a 'proximity touch'. Furthermore, an action where a pointer actually touches the touch screen is called a 'contact touch'. The meaning of a position on the touch screen proximity-touched by the pointer is a position of the pointer that vertically opposes the touch screen when the pointer performs the proximity touch.

The proximity sensor detects a proximity touch and a proximity touch pattern (e.g., a proximity touch distance, a proximity touch duration, a proximity touch position, or a proximity touch shift state). Information corresponding to the detected proximity touch and the detected proximity touch pattern can be output to the touch screen.

The audio output module 152 supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The alarm unit 153 may signal or otherwise identify the occurrence of a particular event associated with the mobile terminal 100. Typical events include call received, message received and user input received.

The alarm unit 153 outputs a signal for announcing the event occurrence via vibration as well as via video or audio signal. The video or audio signal can be output via the display 151 or the audio output unit 152. Therefore, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For example, different vibrations may be output by being synthesized together or may be output in sequence.

The haptic module 154 is able to generate various tactile effects as well as vibration. For example, the haptic module 154 may generate the effect of an arrangement of pins vertically moving against a contact skin surface, the effect of an injection/suction power of air though an injection/suction hole, the effect of skimming over a skin surface, the effect of contact with an electrode, the effect of electrostatic force, or the effect of hold/cold using an endothermic or exothermic device.

The haptic module 154 can be implemented to enable a user to sense the tactile effect through a muscle sense of a finger, an arm or other body part as well as to transfer the tactile effect through a direct contact. At least two haptic modules 154 can be provided in the mobile terminal 100 in accordance with the corresponding configuration of the mobile terminal.

The projector module 155 is an element for performing an image projector function using the mobile terminal 100. The projector module 155 may display an image, which is identical to or partially different from the image displayed on the display 151, on an external screen or wall according to a control signal from the controller 180.

The projector module 155 may include a light source (not shown) such as a laser for projecting an image externally, an image producing means for producing an image to output externally using the light generated from the light source, and a lens for enlarging the externally output image in a predetermined focus distance. The projector module 155 can further include a device for adjusting an image projected direction by mechanically moving the lens or the entire projector module.

The projector module 155 can be classified as a CRT (cathode ray tube) module, an LCD (liquid crystal display) module, or a DLP (digital light processing) module according to a type of display means. Specifically, the DLP module is operated by enabling the light generated from the light source to reflect on a DMD (digital micro-mirror device) chip and can be advantageous for limiting the size of the projector module 155.

Preferably, the projector module 155 is provided in a length direction of a lateral, front or backside direction of the mobile terminal 100. However, it is understood that the projector module 155 may be provided on any portion of the mobile terminal 100.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

A recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, multimedia card micro type memory, card-type memory (e.g., SD memory, XD memory), and other similar memory or data storage devices. The mobile terminal 100 operate in association with web storage for performing a storage function of the memory 160 on the Internet.

The interface unit 170 is often implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, or an earphone port.

The identity module is a chip for storing various kinds of information for authenticating a user's authority to use the mobile terminal 100 and can include a User Identify Module (UIM), a Subscriber Identity Module (SIM), or a Universal Subscriber Identity Module (USIM). A device having the identity module (hereinafter called 'identity device') can be manufactured as a smart card. Therefore, the identity device is connectible to the mobile terminal 100 via a corresponding port.

When the mobile terminal 110 is connected to an external cradle, the interface unit 170 provides a passage for supplying the mobile terminal 100 with power from the cradle or a passage for delivering various command signals to the mobile terminal 100 that are input from the cradle by a user. Each of the various command signals input from the cradle or the power can operate as a signal enabling the mobile terminal 100 to determine that it is correctly loaded in the cradle.

The controller 180 typically controls the overall operations of the mobile terminal 100. For example, the controller 180 performs the control and processing associated with voice calls, data communications, instant message communication, video calls, camera operations and recording operations. Furthermore, the controller 180 may perform a pattern recognizing process for recognizing a writing input and a picture drawing input performed on the touch screen as characters or images.

The controller 180 may include a multimedia module 181 that provides multimedia playback. The multimedia module 181 may be configured as part of the controller 180 or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination of these devices. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

Figure 2A:
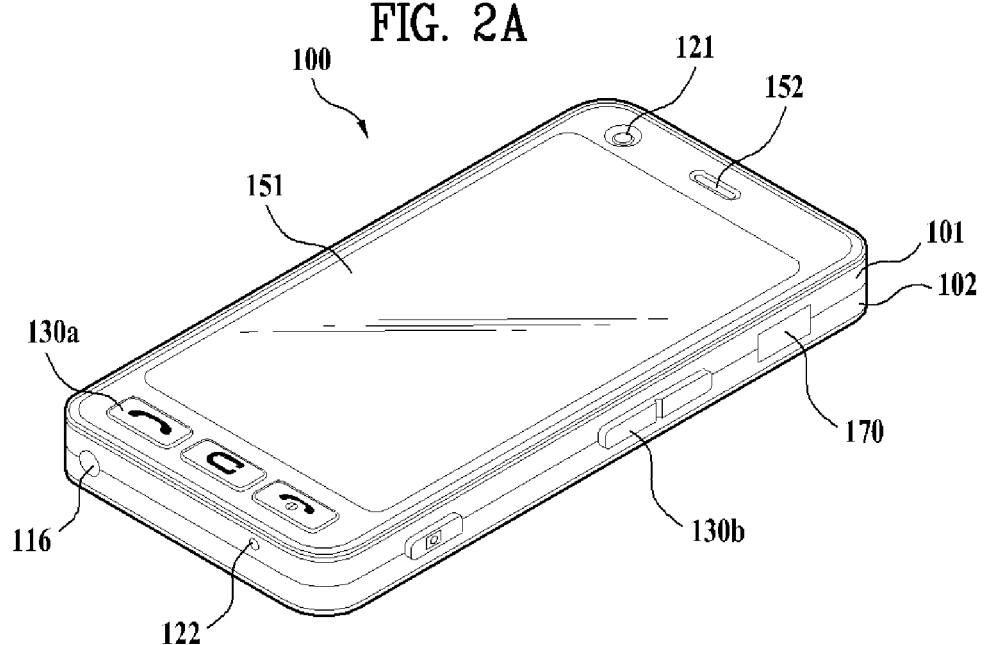
FIG. 2A is a front perspective diagram of a mobile terminal according to one embodiment of the present invention.
Figure 2B:
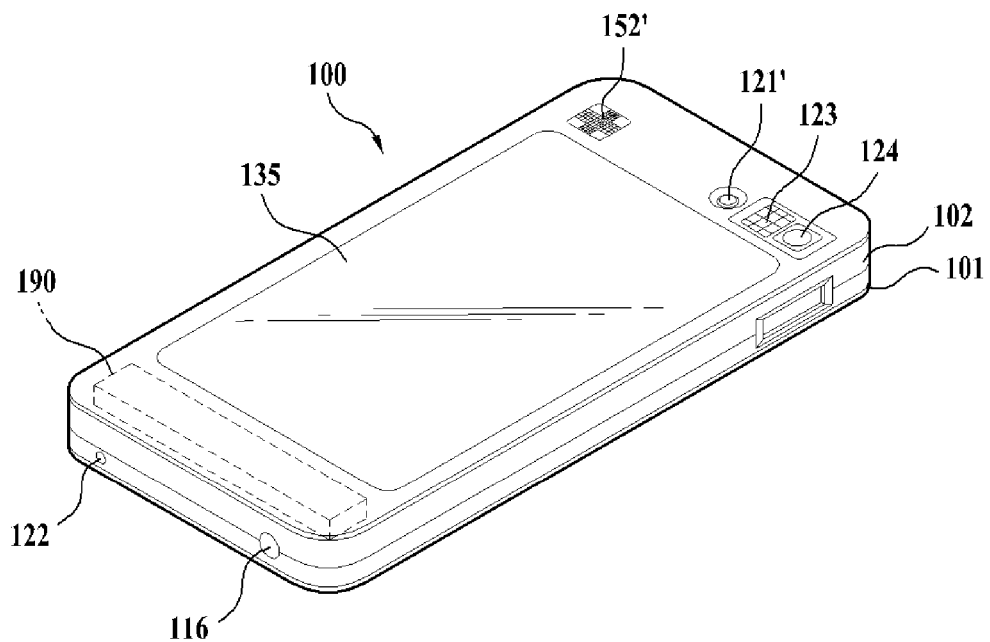
FIG. 2B is a rear perspective diagram of a mobile terminal according to one embodiment of the present invention.

FIG. 2A is a front perspective diagram of a mobile terminal according to one embodiment of the present invention. FIG. 2B is a perspective diagram of a backside of the terminal shown in FIG. 2A.

The mobile terminal 100 illustrated in FIGS. 2A and 2B has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

As illustrated in to FIG. 2A, the mobile terminal 100 includes a case (casing, housing, cover, etc.) configuring an exterior of the mobile terminal. The case can be divided into a front case 101 and a rear 102 case. Various electric/electronic parts are located in a space between the front 101 and rear 102 cases. Optionally, at least one middle case can be provided between the front 101 and rear 102 cases.

The cases 101 and 102 may be formed by injection molding synthetic resin. The cases 101 and 102 may also be formed of a metal substance such as stainless steel (STS) or titanium (Ti). The display 151, audio output unit 152, camera 121, manipulating units 130a and 130b, microphone 122, and interface unit 170 can be provided on the terminal body, specifically on the front case 101.

The display 151 occupies most of a main face of the front case 101. The audio output unit 152 and the camera 121 are provided on an area adjacent to one of the end portions of the display 151, while one manipulating input unit 130a and the microphone 122 are provided on another area adjacent to the other end portion of the display. The other manipulating unit 130b and the interface unit 170 can be provided on lateral sides of the front and rear cases 101 and 102.

The input unit 130 is manipulated to input a command for controlling an operation of the terminal 100 and may include the manipulating units 130a and 130b. The manipulating units 130a and 130b can be called a manipulating portion and may adopt any mechanism having a tactile manner that enables a user to perform a manipulation action by experiencing a tactile feeling.

Content input via the first or second manipulating unit 130a or 130b can be diversely set. For example, a command such as start, end, or scroll is input via the first manipulating unit 130a and a command for a volume adjustment of sound output from the audio output unit 152 or a command for switching to a touch recognizing mode of the display 151 can be input via the second manipulating unit 130b.

As illustrated in FIG. 2B, an additional camera 121' can be provided on a rear side of the terminal body, specifically on the rear case 102. The camera 121' has a photographing direction that is substantially opposite to that of the camera 121 illustrated in FIG. 2A and may have pixels differing from those of the camera 121.

Preferably, the camera 121 illustrated in FIG. 2A has pixels low enough to capture and transmit a picture of user's face for a video call, while the camera 121' has high pixels for capturing a general subject for photography without transmitting the captured subject. Each of the cameras 121 and 121' can be installed such that they can be rotated or popped up.

A flash 123 and a mirror 124 are additionally provided adjacent to the camera 121'. The flash 123 projects light toward a subject for photographing the subject using the camera 121'. If user attempts to take a self-photography using the camera 121', the mirror 124 enables the user to view his or her face reflected by the mirror 124.

An additional audio output unit 152' can be provided on the rear side of the terminal body. The additional audio output unit 152' may implement a stereo function together with the audio output unit 152 illustrated in FIG. 2A and may be used for implementation of a speakerphone mode while talking.

A broadcast signal receiving antenna 124 can be provided on the lateral side of the terminal body as well as an antenna for communication. The antenna 124 comprising a portion of the broadcast receiving module 111 illustrated in FIG. 1 can be retractably provided on the terminal body.

A power supply unit 190 for supplying power to the terminal 100 is provided. The power supply unit 190 can be configured to be located within the terminal body. Alternatively, the power supply unit 190 can be configured to be detachably connected to the terminal body.

A touchpad 135 for detecting a touch can be provided on the rear case 102. The touchpad 135 can be configured as a light transmittive type similar to the display 151.

If the display 151 is configured to output visual information from both its faces, it possible to recognize the visual information via the touchpad 135 as well. The information output from both faces of the display 151 can be entirely controlled by the touchpad 135. Alternatively, a display may be provided on the touchpad 135 so that a touchscreen can be provided on the rear case 102 as well.

The touchpad 135 is activated by interconnecting with the display 151 of the front case 101. The touchpad 135 can be provided at the rear of the display 151 in parallel. The touchpad 135 can have a size equal to or smaller than the size of the display 151.

In the following description, a method of cropping an image according to a zoom magnification change of the camera 121 from an original image and storing the cropped image is explained in detail with reference to FIGS. 3 to 15.

In the following description of the embodiments, assume that the display 151 includes a touchscreen. If the display 151 includes the touchscreen, it is able to further facilitate the implementation of the following embodiments.

In the following description, a display screen of the touchscreen, on which a first image that is displayed is a preview image input from the camera 121, shall be indicated by a reference number 300. A region corresponding to a second image within the first image, of which the zoom magnification is changed, shall be indicated by a reference number, specifically 400a, 400b and 400c.

Figure 3:
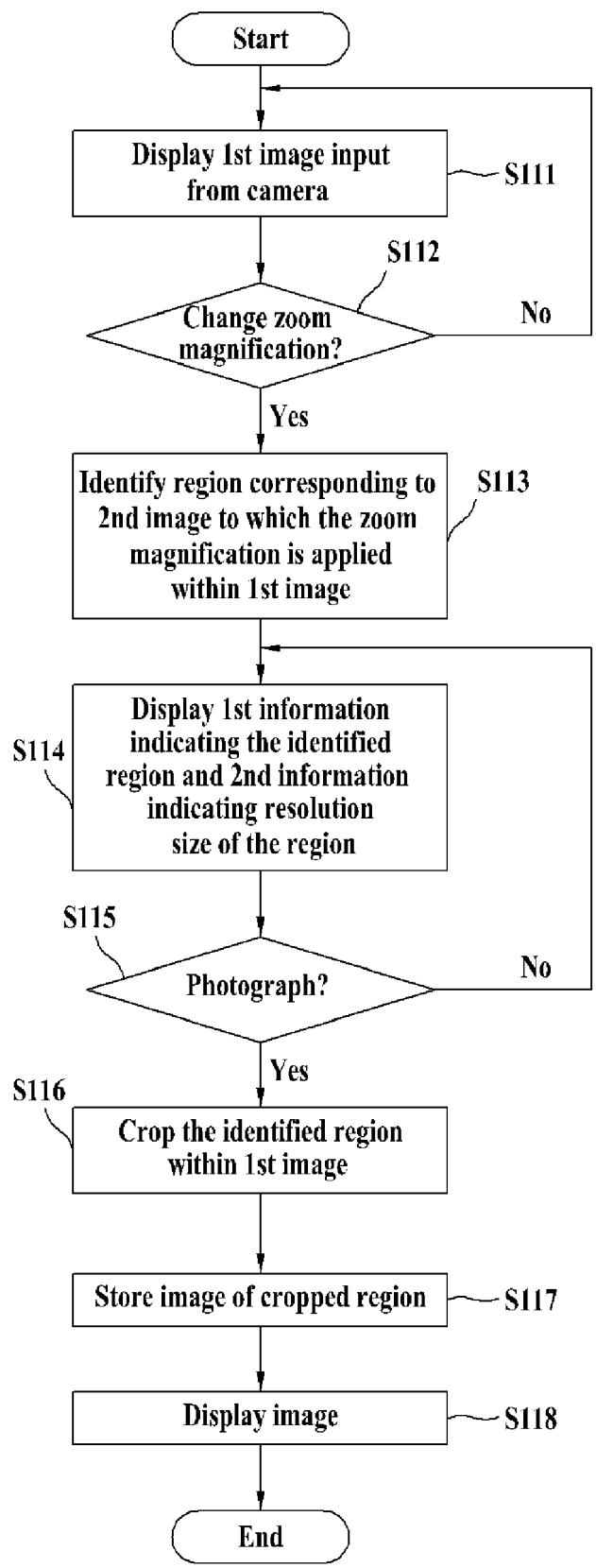
FIG. 3 is a flowchart for a method of controlling a mobile terminal according to one embodiment of the present invention.

A method of controlling the mobile terminal 100 according to one embodiment of the present invention is explained with reference to FIGS. 3 to 15. FIG. 3 is a flowchart for a method of controlling a mobile terminal according to one embodiment of the present invention. FIGS. 4 to 15 show configurations of a screen on which a method of controlling a mobile terminal according to the present invention is displayed.

Referring to FIGS. 3 to 15, if the camera 121 is activated, the controller 180 displays a first image 300 that is a preview image input from the camera 121 on the touchscreen 151 [S111]. While the first image 300 is displayed, if a command for a zoom magnification change of the first image 300 is input by a user via the user input unit 130 or the touchscreen 151 [S112], the controller 180 identifies a region corresponding to a second image to which the zoom magnification is applied within the first image 300 [S113].

The user is able to manipulate zoom-in or zoom-out of the first image 300 via a means provided as the user input unit 130, such as a keypad, a dome switch, a jog wheel, or a jog switch. A scroll bar 330 configured provide a command for the zoom-in or zoom-out of the first image 300 can be displayed on one portion of the touchscreen 151 on which the first image 300 is displayed and the user enables the first image 300 to zoom in or out by manipulating the scroll bar 300 in a zoom-in or zoom-out direction.

When the region is identified that corresponds to the second image to which the received zoom magnification is applied, the controller 180 displays first information 400 indicating the identified region and second information 410 indicating a resolution size of the region within the first image 300 displayed on the touchscreen 151 [S114]. The resolution size of the region refers to a resolution size occupied by the region indicated by the first information 400 within the resolution size of the first image 300. When the resolution size of the region within the first image 300 is identified, the controller 180 may output a sound for announcing the resolution size of the region by controlling the audio output module 152.

The controller 180 is able to transparently display the first information 400 and the second information 410 within the first image 300. Specifically, the controller 180 displays the first information 400 and the second information 410 transparently to enable the user to identify the first image 300. Such that the transparency of the first information 400 and the second information 410 can be adjusted by the user.

The first information 400 is information for enabling the user to identify the region within the first image 300. The first information 400 can be displayed in a shape indicating an outline of the region.

The controller 180 is able to display a preview image of the region on a background of the second information 410. The controller 180 is able to display the second information 410 varying in size according to a resolution size of the identified region.

For instance, as the resolution size of the region is increased, the controller 180 controls the second information 410 to be displayed in a larger size. As the resolution size of the region is decreased, the controller 180 controls the second information 410 to be displayed in a smaller size.

If the second information 410 is selected from the screen according to a first selecting manner, the controller 180 displays a zoom magnification value for the first image 300 and at least the resolution size of the first image 300 or the resolution size of the region. The first selecting manner can include a short touch to the second information 410.

If the second information 410 is selected from the screen according to a second selecting manner different from the first selecting manner, the controller 180 crops the region from the first image 410 and then stores and displays the cropped region. The second selecting manner can include a long touch to the second information 410. Specifically, the long touch means that a touch of the second information 410 is maintained for preset duration while the touch of the second information 410 is maintained.

If a command for photographing the region to which the zoom magnification is applied within the first image 300 is received via the user input unit 130 or the touchscreen 151 [S115] while the first information 400 and the second information 410 are displayed within the first image 300, the controller 180 crops the region within the first image 300 corresponding to the original image [S116]. The controller 180 then stores [S117] and displays [S118] an image of the cropped region.

For example, if the resolution size of the first image 300 is 12M of 4040×3032, the resolution size of the region corresponding to the second image to which the zoom magnification is applied within the first image 300 is 8M of 3264×2448, the controller 180 does not store the second image in a size of 12M of 4040×3032. Instead, the controller 180 crops and stores the second image in a size of 8M of 3264×2448. This is explained in detail with reference to Table 1 and Formula 1.

TABLE 1

| Resolution size | No. of horizontal pixels | No. of vertical pixels | Total No. of pixels | Zoom magnification |
|---|---|---|---|---|
| 12 M | 4040 | 3032 | 12249280 | 1.0 |
| 8 M | 3264 | 2448 | 7990272 | 1.2 |
| 5 M | 2592 | 1944 | 5038848 | 1.6 |
| 3 M | 2048 | 1536 | 3145728 | 2.0 |
| 2 M | 1600 | 1200 | 1920000 | 2.5 |
| 1 M | 1280 | 960 | 1228800 | 3.1 |
| HD (720p) | 1280 | 720 | 921600 | 3.6 |
| VGA | 640 | 480 | 307200 | 6.3 |
| QVGA | 320 | 240 | 76800 | 12.6 |

$$\text{Zoom Magnification} \geq \text{SQRT}(\text{Resolution size of first image/resolution size of region}) \quad \text{[Formula 1]}$$

Referring to Table 1 and Formula 1, if the resolution size of the first image 300 is initially set to 12M and the resolution size of the region corresponding to the second image resulting from the zoom-in of the first image 300 is VGA within the first mage 300, the zoom magnification is calculated to approximately 6.3 according to Formula 1. Specifically, the zoom magnification of the camera 121 according to the present invention is supported over 6.31 and the second image can be stored in a manner that the maximum resolution size of 12M is lowered to the minimum resolution size of the VGA.

As mentioned previously, when the second image is photographed, of which zoom magnification is changed for the first image 300, the region indicated by the first information 400 corresponding to the second image within the first image 300 is cropped and stored instead of storing the second image with the resolution size of the first image. Therefore, the present invention reduces a size of a stored image without degradation of the picture, thereby increasing an available size of the memory 160. The controller 180 also enables the cropped image of the region 400 to be displayed as a full-screen image.

The controller 180 is able to store the cropped image of region 400 in the memory 160 by inserting information indicating that the image is cropped within the first image 300 into an image name of the region. The controller 180 is able to store the cropped image of the region indicated by the first information 400 in the memory 160 by inserting information indicating the resolution size of the first image 300 and the resolution size of the region into an image name of the region.

The controller 180 is able to store the cropped image of the region indicated by the first information 400 in the memory 160 by inserting information indicating that the image is cropped within the first image 300, information on the zoom magnification and at least the resolution size of the first image 300 or the resolution size of the image into image meta information of the region. The controller 180 is able to store the cropped image of the region indicated by the first information 400 in the memory 160 such that the cropped image can be discriminated from non-cropped images among previously stored images.

For example, the memory 160 can be provided with a plurality of storage spaces in which images differing from each other in resolution size are stored such that they may be discriminated from each other. The controller 180 is able to store the cropped image of the region in a storage space corresponding to the resolution size of the cropped region.

Figure 4:
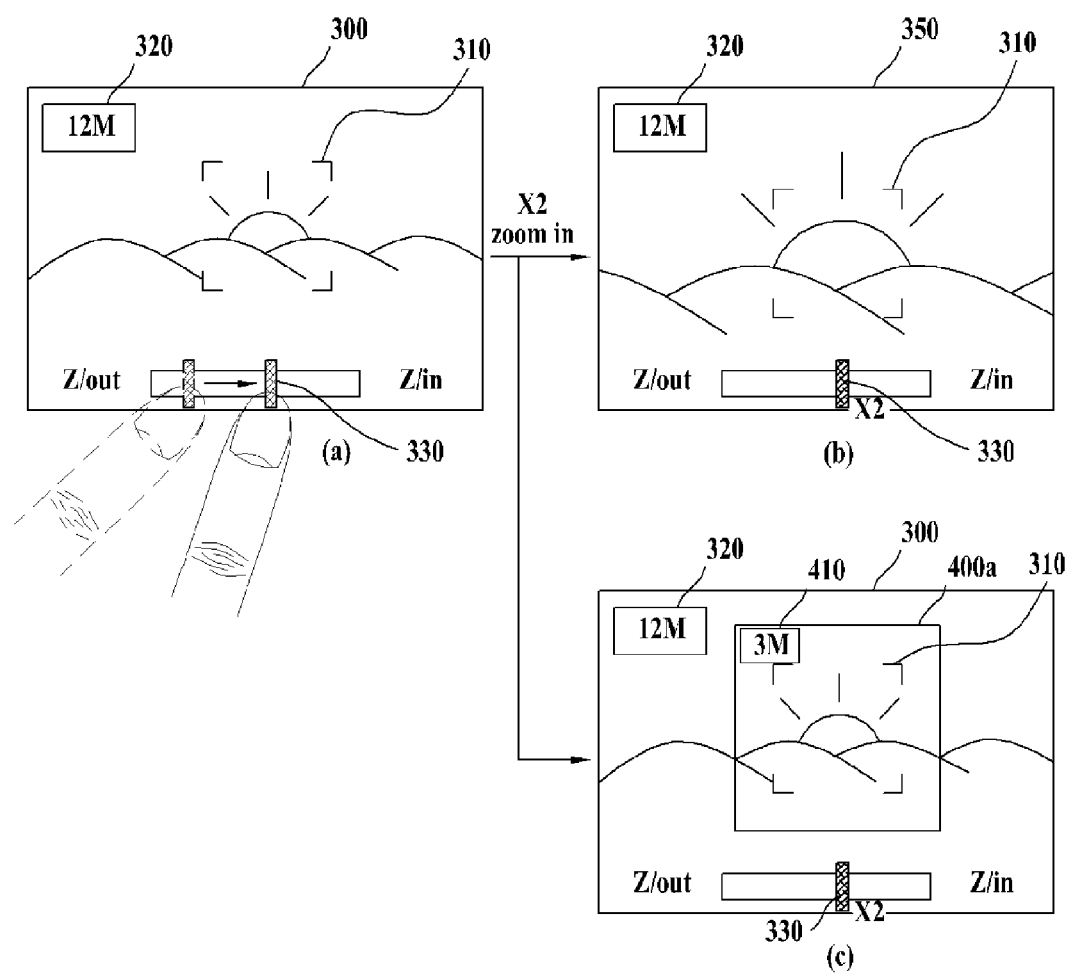

A controlling method according to the present invention is explained in detail with reference to FIGS. 4 to 15. FIG. 4 illustrates a first image 300 input from the camera 121 displayed on the touchscreen 151. Reference number 310 indicates a focus identifier for focusing on the first image 300 and reference number 330 indicates a scroll bar for facilitating zoom-in or zoom-out of the first image 300.

If a zoom magnification of the first image 300 is changed via manipulation of the scroll bar 330, the controller 180 displays the changed zoom magnification value around the scroll bar 330. Third information 320 indicating a current resolution size of the first image 300 can be displayed within the first image 300.

As illustrated FIG. 4(*a*), if the first image 300 having the resolution size of 12M is zoomed in by 1.2× from 1× via the scroll bar 330, the controller 180 displays the first image zoomed in by 1.2× maintaining the resolution size of the first image, as shown FIG. 4(*b*) according to the related art. However, according to the present invention, if the first image 300 is zoomed in by 1.2× from 1×, the controller 180 identifies a region within the first image resulting from zooming in the first image by 1.2× and then displays first information 400*a* indicating the identified region and second information 410 indicating a resolution size of the region within the first image as illustrated in FIG. 4(*c*).

Specifically, referring to Table 1, if the first image 300 having the resolution size of 12M is zoomed in by 1.2× from 1×, the 1.2×-zoom-in region of the first image has a resolution size of about 8M within the first image. Therefore, the controller 180 displays the first information 400*a* for identifying the region and the second information 410 indicating the resolution size (8M) of the region within the first image 300.

Figure 5:
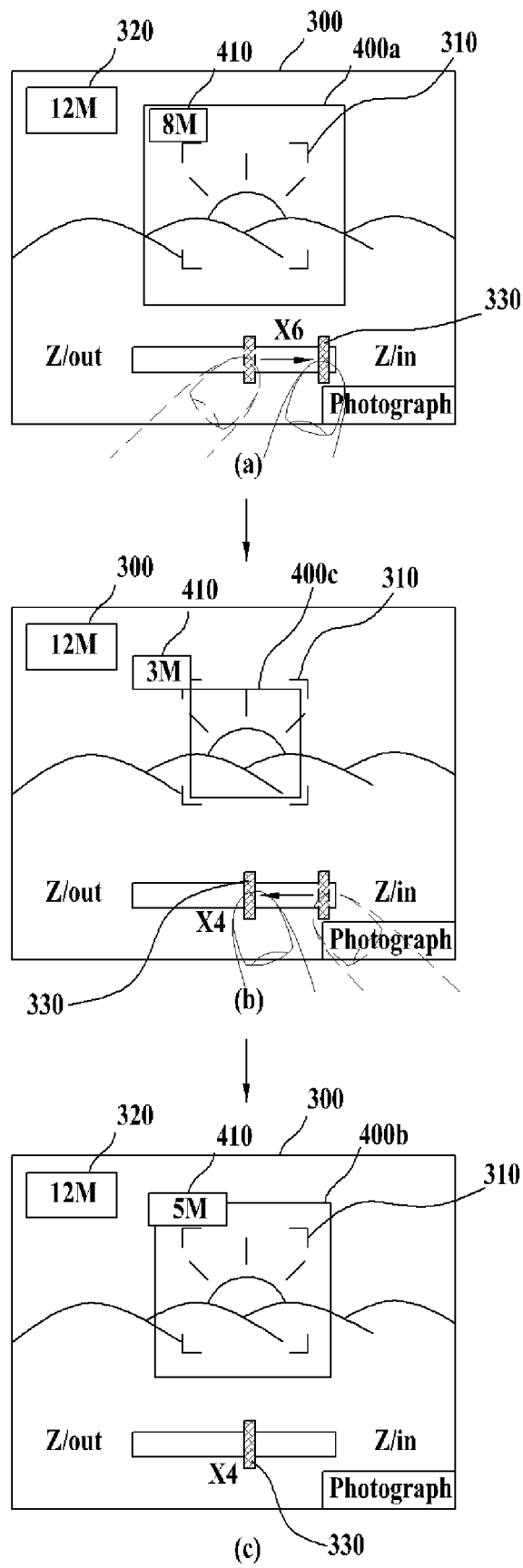

As illustrated FIG. 5(*a*), while the information 400*a* and 410 of the region resulting from zooming in the first image 300 from 1× to 1.2× are displayed within the first image, as shown FIG. 4(*c*), the first image is zoomed in from 1× to 2×. As illustrated in FIG. 5(*b*), the controller 180 identifies a region within the first image resulting from zooming in the first image by 2× and then displays first information 400*b* indicating the identified region and second information 410 indicating a resolution size of the region within the first image.

While the information 400*b* and 410 of the region resulting from zooming in the first image 300 from 1× to 2× are displayed within the first image, the first image is zoomed in from 1× to 1.6×. As illustrated in FIG. 5(*c*), the controller 180 identifies a region within the first image 300 resulting from zooming in the first image by 1.6× and then displays first information 400*c* indicating the identified region and second information 410 indicating a resolution size of the region within the first image.

Figure 6:
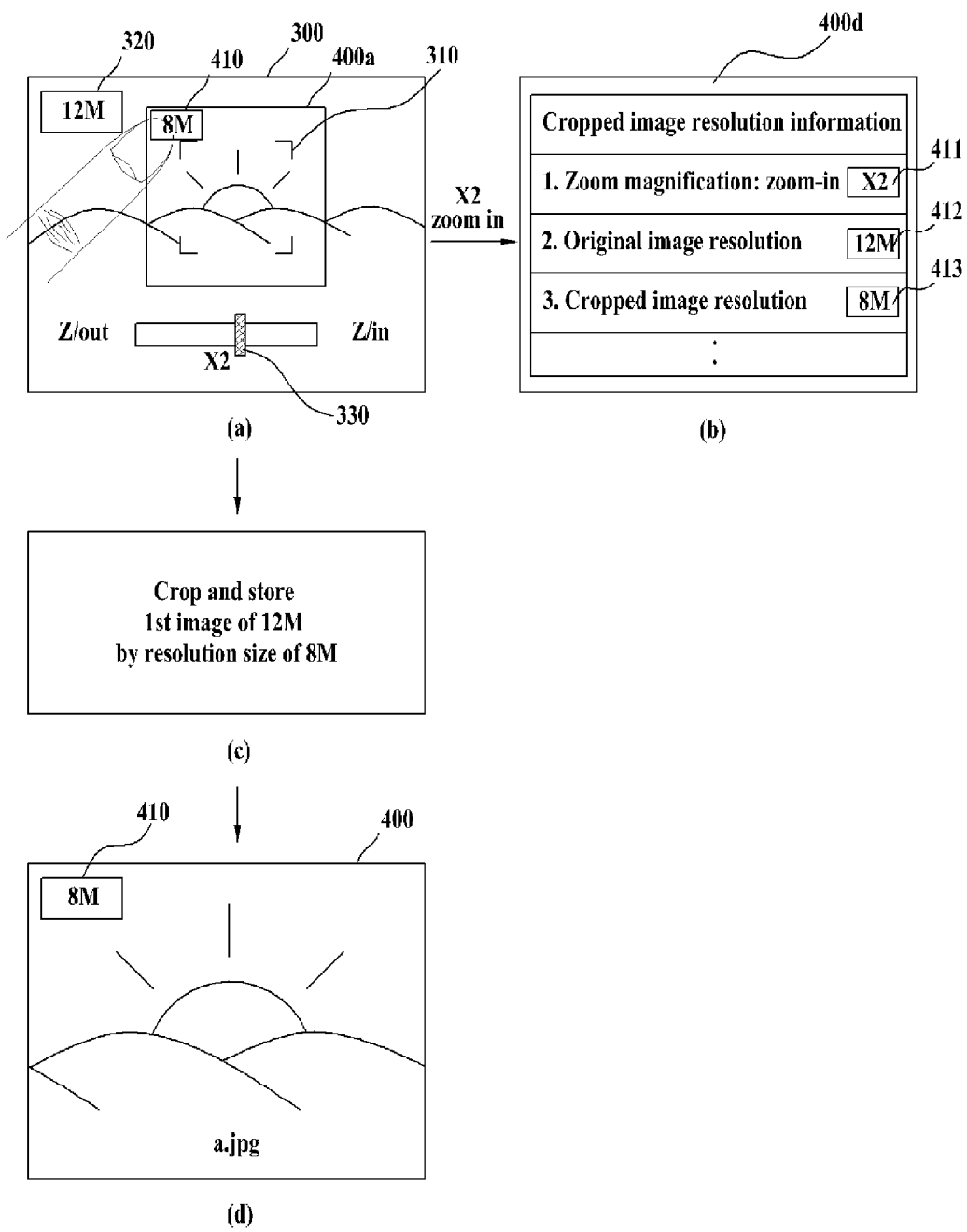

As illustrated in FIG. 6(*a*), information 400*a* and 410 of a region resulting from zooming in a first image 300 from 1× to 1.2× are displayed within the first image 300. If the second information 410 is short touched by a user, as illustrated in FIG. 6(*b*), the controller 180 displays detailed resolution size information 400*d* of the region to crop on the screen. Specifically, the detailed resolution size information 400*a* can include zoom magnification information (1.2×) 411 of the region, resolution size information (12M) 412 of the first image 300 and resolution size information (8M) 413 of the region.

If the second information 410 is long touched by a user, the controller 180 crops the region from the first image 300, and stores an image of the cropped region in the memory 160, as illustrated FIG. 6(*c*). The controller 180 is also able to display the image of the cropped region as a full-screen image, as illustrated in FIG. 6(*d*).

Figure 7:
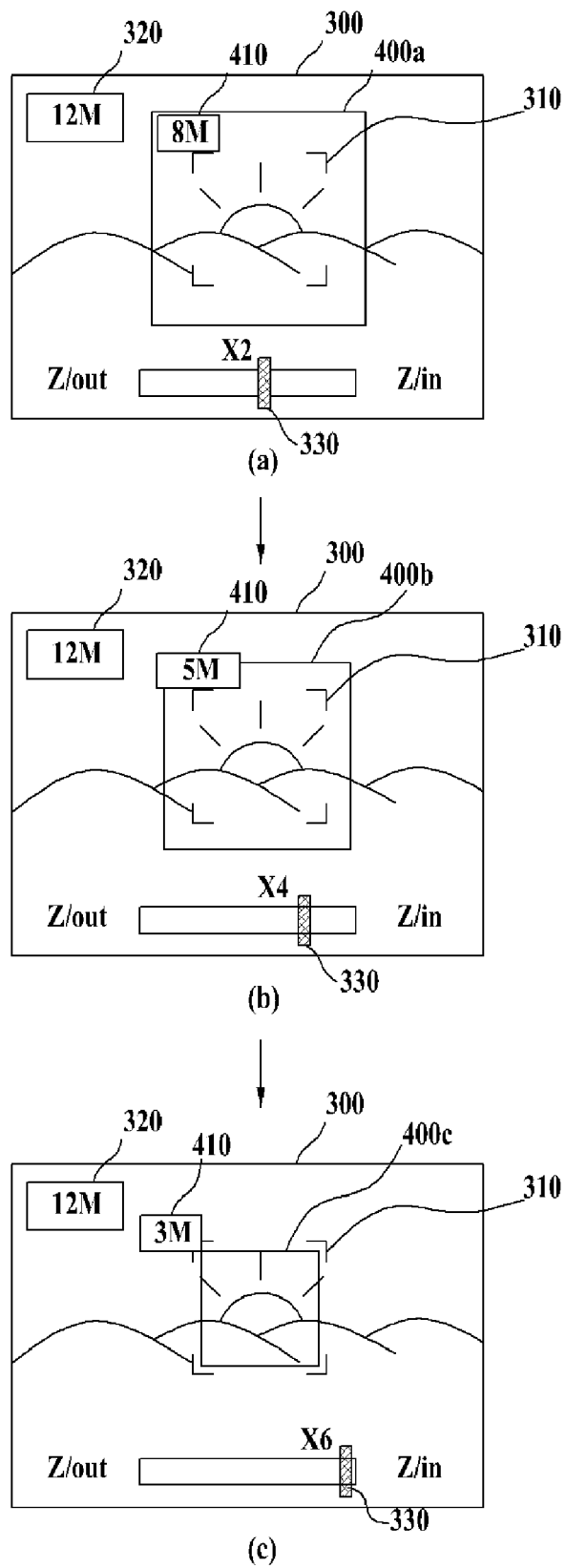

As illustrated in FIG. 7, the controller 180 is able to display the second information such that a size of the second information varies according to the resolution size of the identified region indicated by the first information 400a, 400b or 400c. FIG. 7(a) illustrates that the resolution size of the region indicated by the first information 400a is 8M. FIG. 7(b) illustrates that the resolution size of the region indicated by the first information 400b is 5M. FIG. 7(c) illustrates that the resolution size of the region indicated by the first information 400c is 3M.

As illustrated in FIG. 7, as the resolution size of the identified region indicated by the first information 400a, 400b or 400c increases (400c<400b<400a), the controller 180 displays the second information 410 in increasing size. As the resolution size of the identified region indicated by the first information 400a, 400b or 400c decreases (400a>400b>400c), the controller 180 displays the second information 410 in decreasing size.

Figure 8:
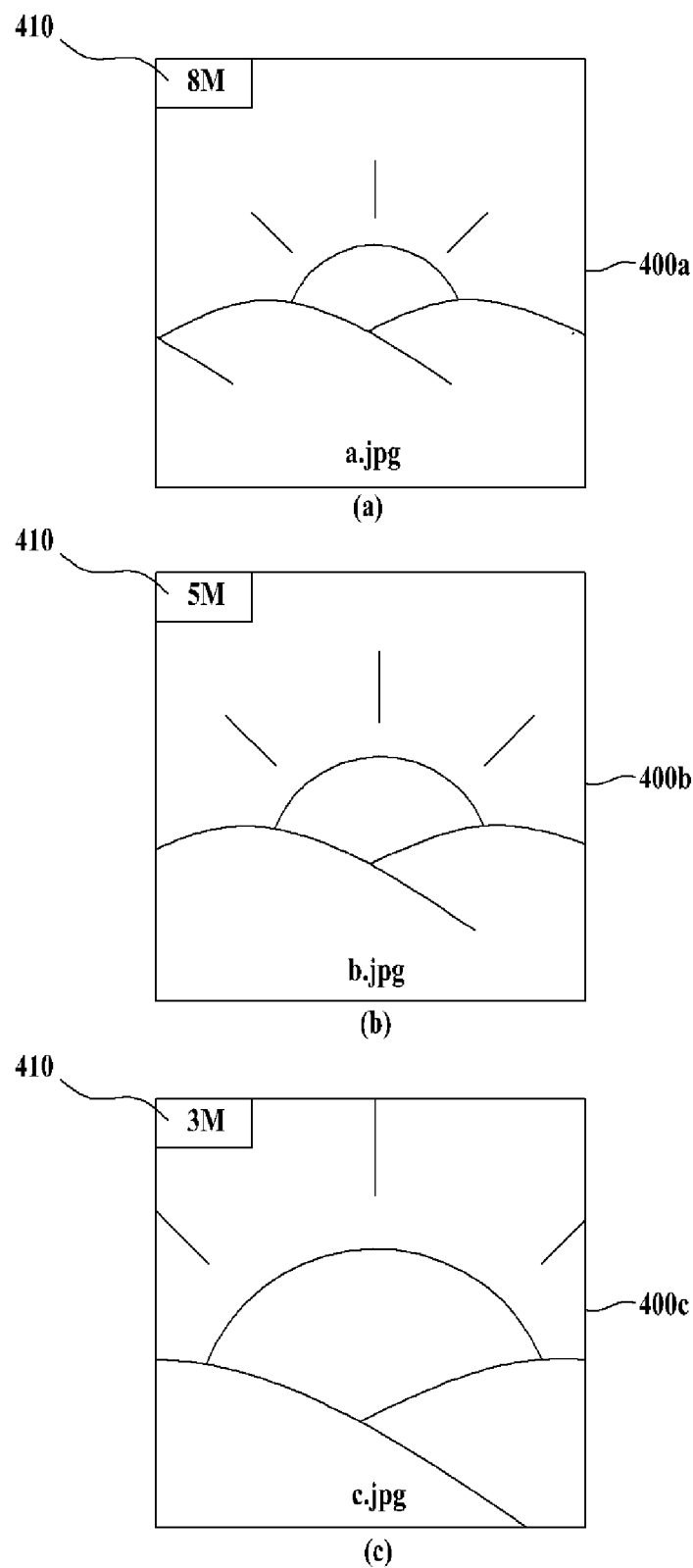

As illustrated FIG. 8, an image of the region indicated by the first information 400a, 400b or 400c is previewed within the second information 410 indicating the resolution size of the region. Specifically, if the information indicated by the first information 400a and second information 410 of the region resulting from zooming in the first image 300 from 1× to 1.2× are displayed within the first image shown in FIG. 4(c), the controller 180 displays a preview of an image of the region within a background of the second information. Therefore, if the region indicated by the first information 400a is cropped, the controller 180 enables a user to preview the image of the cropped region.

If the information first information 400b and second information 410 of the region resulting from zooming in the first image 300 from 1× to 2× are displayed within the first image illustrated in FIG. 5(b), the controller 180 displays a preview of an image of the region indicated by the first information within a background of the second information. Therefore, if the region indicated by the first information 400b is cropped, the controller 180 enables a user to preview the image of the cropped region.

If the information first information 400c and second information 410 of the region resulting from zooming in the first image 300 from 1× to 1.6× are displayed within the first image illustrated in FIG. 5(c), the controller 180 displays a preview of an image of the region indicated by the first information within a background of the second information. Therefore, if the region indicated by the first information 400c is cropped, the controller 180 enables a user to preview the image of the cropped region.

As illustrated FIG. 9(a), while the first information 400a and second information 410 of the region resulting from zooming in the first image 300 from 1× to 1.2× are displayed within the first image illustrated FIG. 4(c), if the first information indicating the region is touched, the controller 180 recognizes the touch to the first information as a photographing command of the region indicated by the first information. Specifically, if the first information 400a is touched, the controller 180 crops the region indicated by the first information from the first image 300, stores an image of the cropped region in the memory, as illustrated in FIG. 9(b), and displays the image of the cropped region as a full-screen image, as illustrated in FIG. 9(c).

Figure 10:
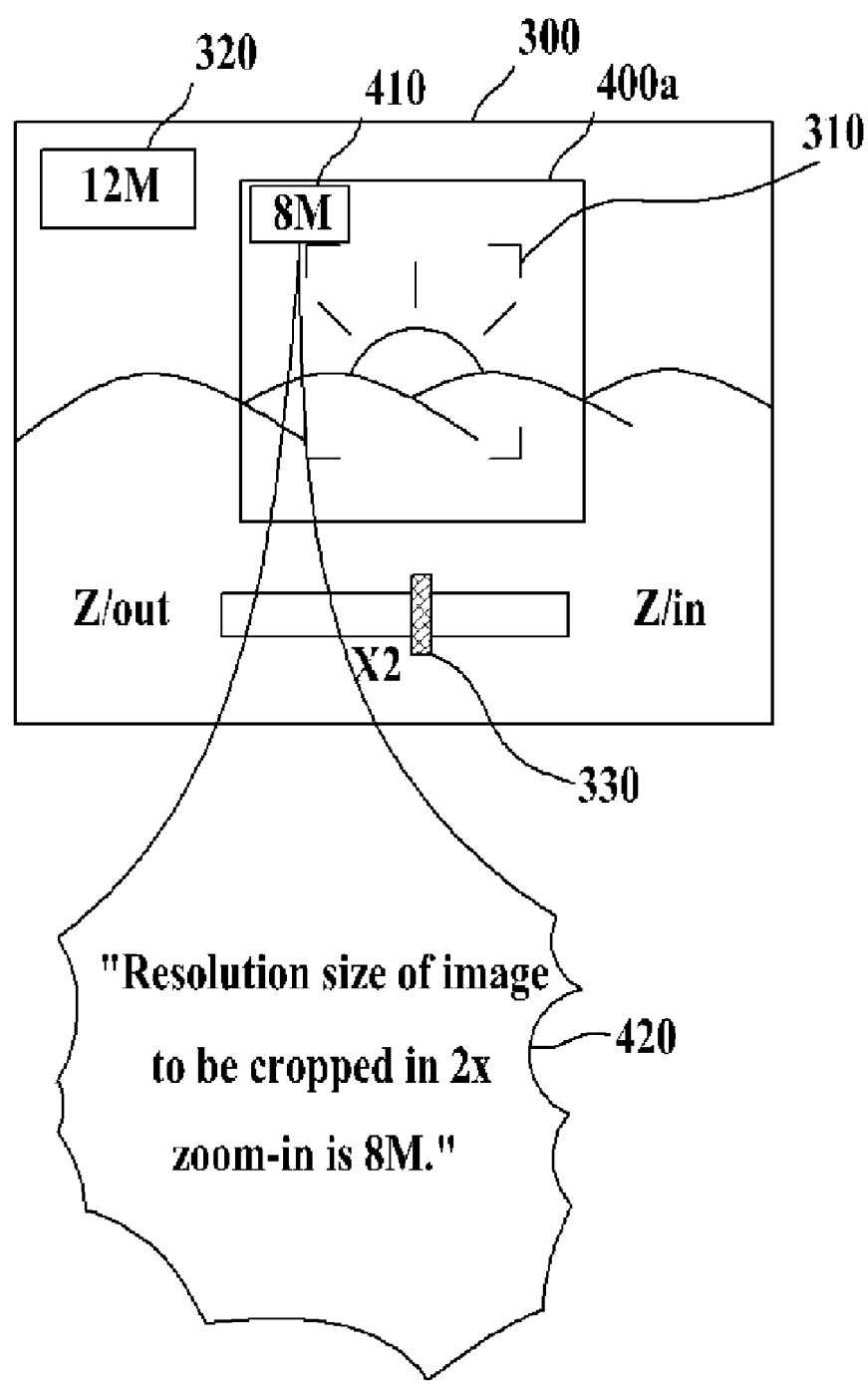

Referring to FIG. 10, if a first image 300 is zoomed in from 1× to 1.2×, the controller 180 identifies a region within the first image indicated by the first information 400a resulting from zooming in the first image 200 by 1.2× and having a resolution size (8M) and outputs a sound announcing the resolution size (8M) of the identified region by controlling the audio output module 152. Specifically, a plurality of audio files for informing a user of resolution sizes of images is provided within the memory 160. The controller 180 searches the memory 160 for the audio file corresponding to the resolution size (8M) of the identified region and then outputs the searched audio file via the audio output module 152.

Figure 11:
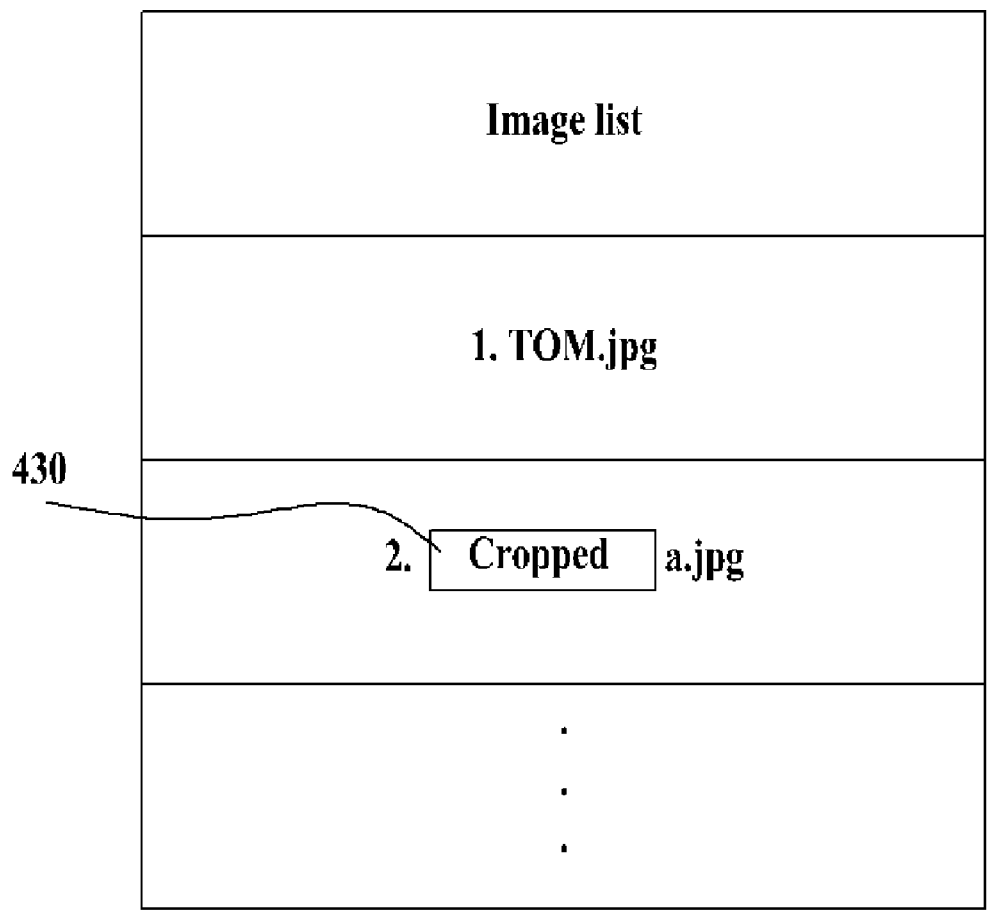

FIGS. 11 to 15 show screen configurations for various methods of storing images of the cropped regions indicated by the first information 400a, 400b and 400c in the memory 160. As illustrated in FIG. 11, the controller 180 stores the image of the cropped region by inserting information 430 indicating that the image is cropped from the first image 300 into an image name of the region indicated by the first information 400a.

Figure 12:
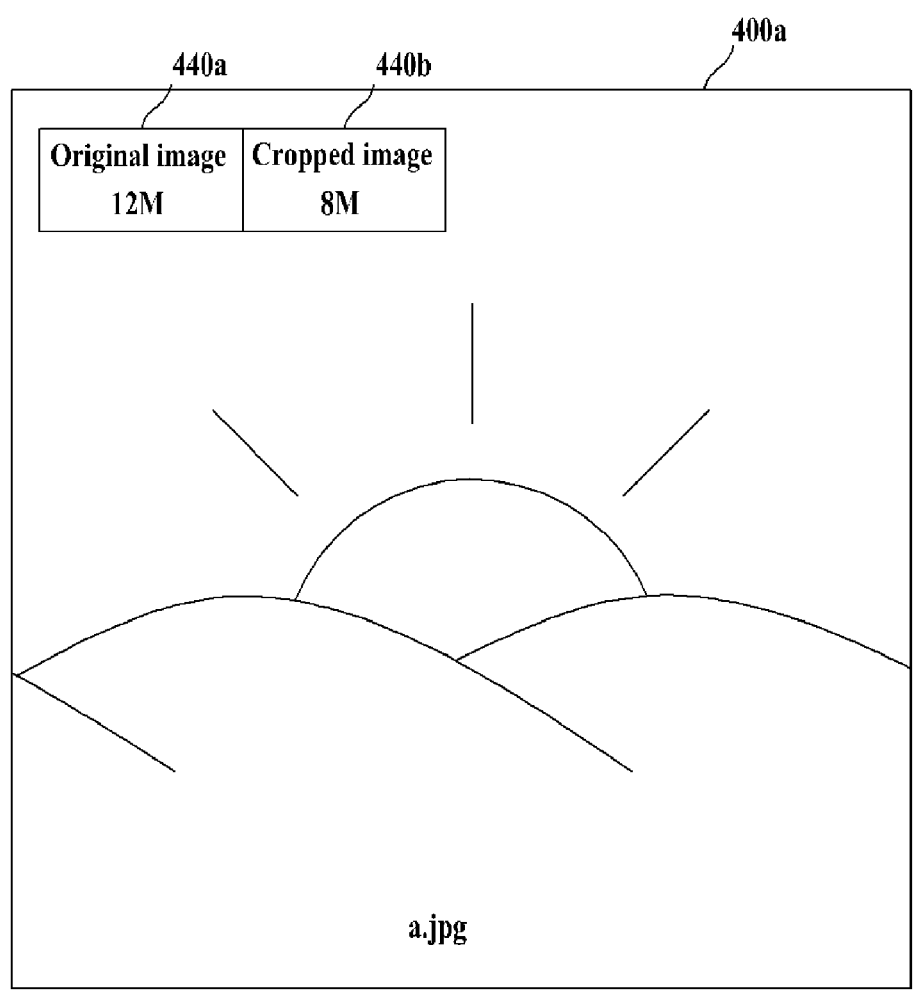
Figure 13:
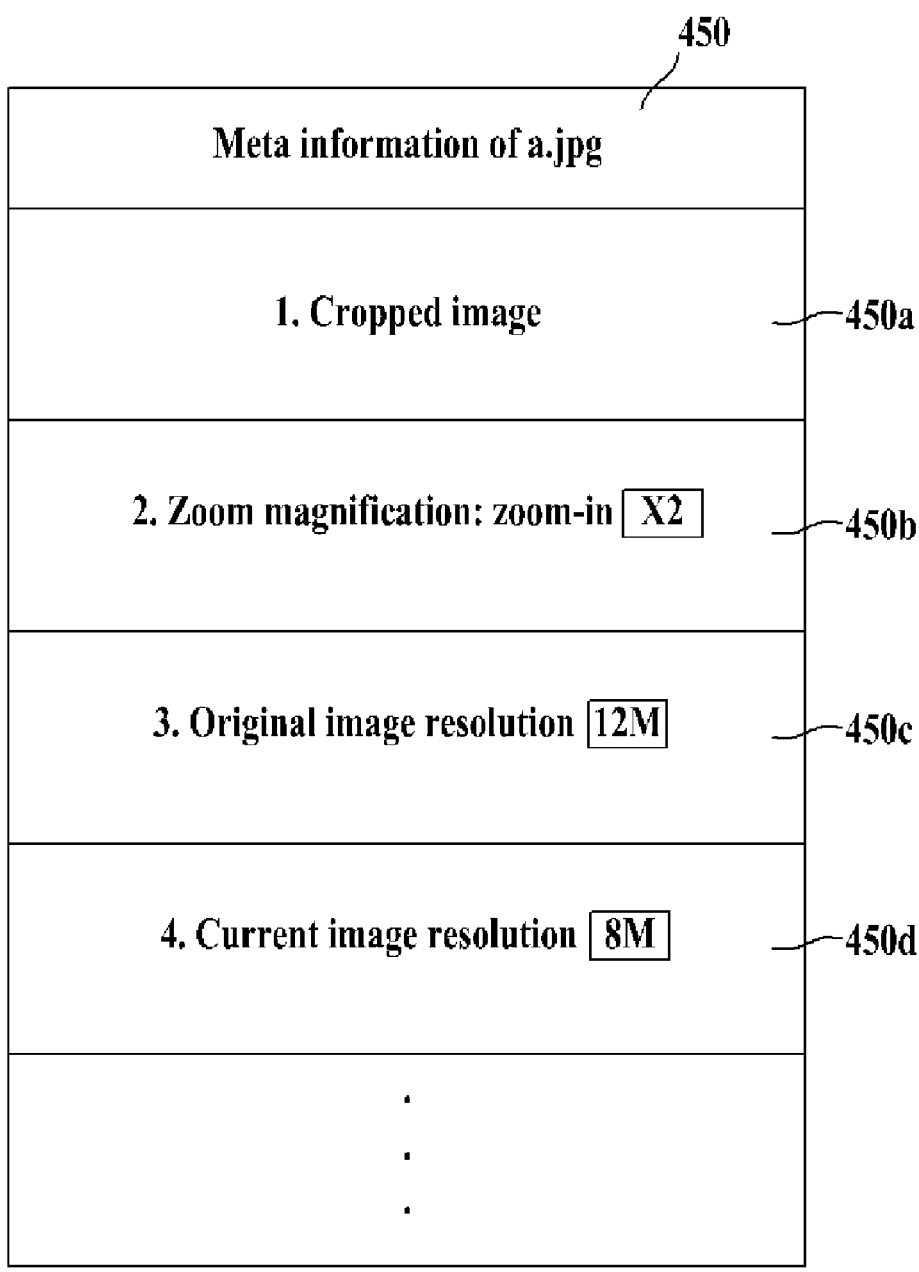
Figure 14:
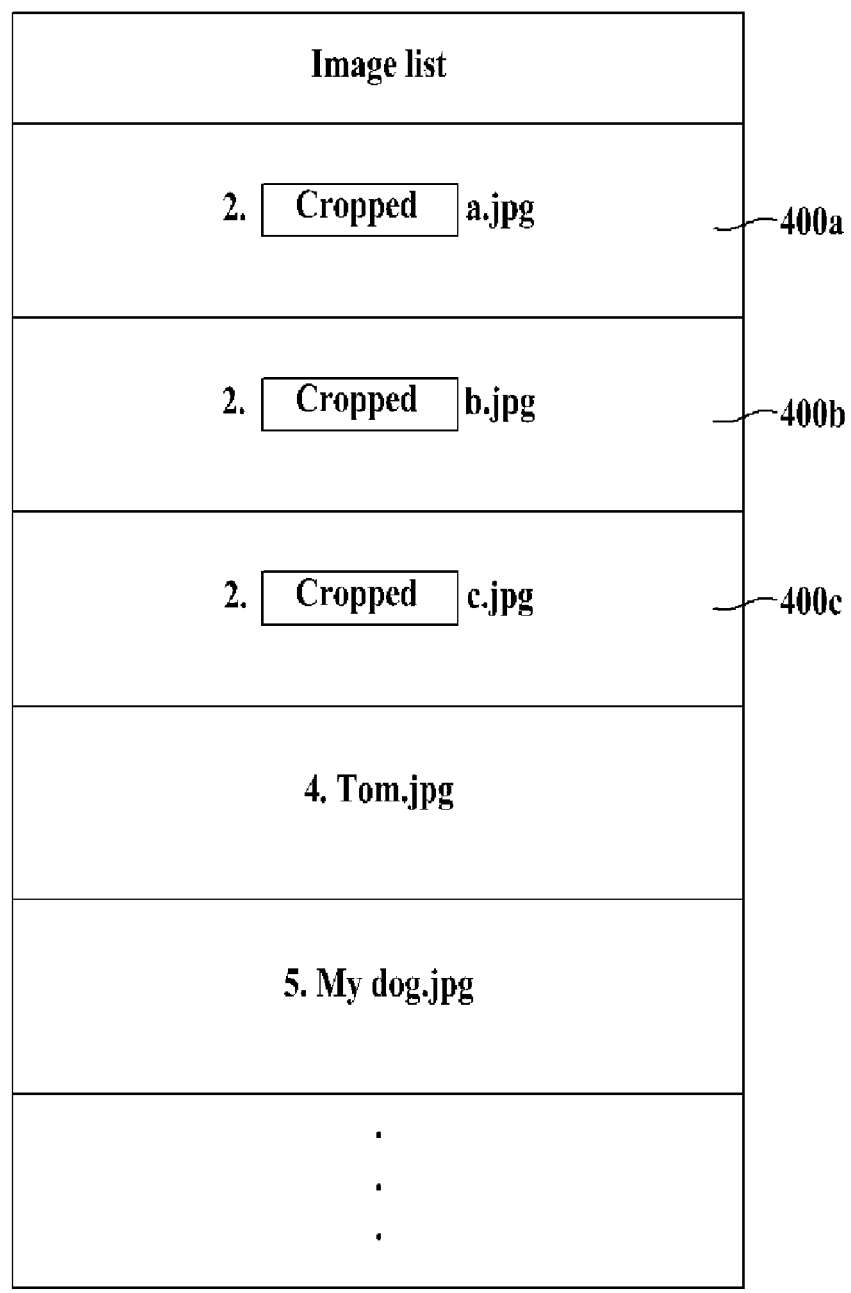

As illustrated FIG. 12, the controller 180 stores the image of the cropped region by inserting information 440a indicating a resolution size of the first image 300 and information 440b indicating a resolution size of the region indicated by the first information 400a into the image of the cropped region. As illustrated in FIG. 13, the controller 180 stores the image of the cropped region by inserting at least information 450a indicating that the image indicated by the first information 400a is cropped from the first image 300, zoom magnification information 450b of the first image, a resolution size 450c of the first image or a resolution size 450d of the cropped image into meta information 450 of the cropped image. As illustrated in FIG. 14, the controller 180 stores the images of the cropped regions indicated by the first information 400a-400c in the memory 160 such that the cropped images may be discriminated from non-cropped images among previously stored images.

Figure 15:
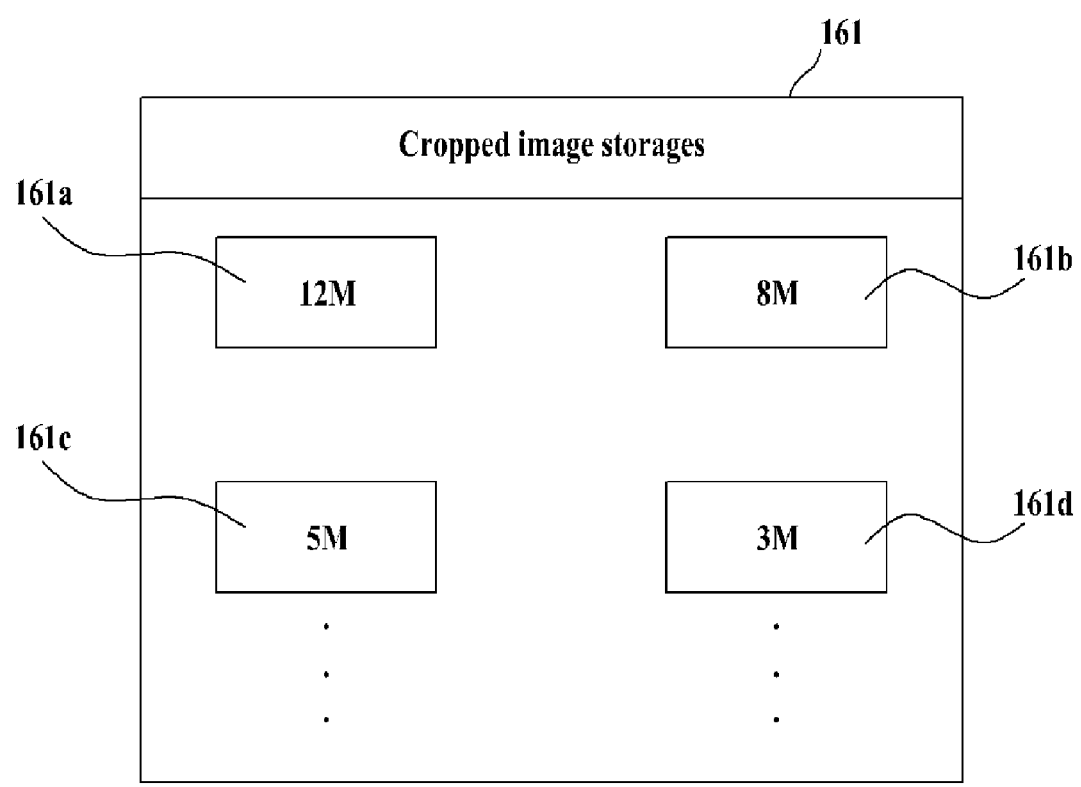

As illustrated in FIG. 15, the memory 160 can be provided with a plurality of storage spaces 161a, 161b, 161c and 161d in which images differing from each other in resolution size are stored such that they may be discriminated from each other. The controller 180 is able to store the image of the cropped region in the storage space corresponding to the resolution size of the cropped region. For example, if an image resolution size of the cropped region indicated by the first information 400a within the first image 300 is 8M, the controller 180 automatically stores an image of the cropped region in an 8M storage space 161b of the memory 160.

As described herein, when a second image having a changed zoom magnification applied for a first image is photographed and stored, the present invention crops and stores a region corresponding to the second image within the first image instead of storing the second image with the resolution size of the first image. Therefore, the present invention reduces a size of a stored image without degradation of a picture, thereby increasing an available size of the memory.

It will be apparent to those skilled in the art that various modifications and variations can be specified into other forms without departing from the spirit or scope of the inventions. In addition, the above-described methods can be implemented in a program recorded medium as computer-readable codes.

For example, the computer-readable media include all types of recording devices in which data readable by a computer system are stored. The computer-readable media include ROM, RAM, CD-ROM, magnetic tapes, floppy discs, and optical data storage devices. The computer-readable media also include carrier-wave type implementations (e.g., transmission via Internet). The computer can include a controller of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
an input unit configured to receive commands;
a camera configured to capture an image and having a zoom function with a corresponding zoom magnification;
a display unit configured to display images; and
a control unit configured to:
control the display unit to display a first image input from the camera,
process a command received by the input unit to change a zoom magnification applied to the displayed first image,
identify a region within the displayed first image corresponding to a second image to which the changed zoom magnification is applied,
control the display unit to display first information indicating the identified region,
process a command received by the input unit to photograph the second image,
crop the photographed second image from the displayed first image and control the display unit to display the cropped second image indicating a resolution size of the identified region in response to selection of displayed second information according to a second scheme,
control the display unit to display at least a zoom magnification value of the cropped second image, a resolution size of the displayed first image or the resolution size of the identified region in response to selection of the displayed second information and according to a first scheme that is different from the second scheme, and
control the display unit to display the first information and the second information transparently within the first image,
wherein the first scheme comprises a user touch to the input unit corresponding to the displayed first information for a duration that is less than a threshold time, and
wherein the second scheme comprises a user touch to the input unit corresponding to the displayed second information for a duration that is greater than the threshold time.

2. The mobile terminal of claim 1, further comprising a memory, wherein the control unit is further configured to control the memory to store the cropped second image.

3. The mobile terminal of claim 2, wherein the displayed second image includes a name containing information indicating that the displayed second image is cropped from the displayed first image.

4. The mobile terminal of claim 2, wherein the displayed second image includes information indicating the resolution size of the displayed first image and a resolution size of the displayed cropped second image.

5. The mobile terminal of claim 2, wherein the control unit is further configured to control the memory to store the displayed cropped second image by inserting third information into meta information of the displayed second information, the third information including at least an indication that the displayed cropped second image is cropped from the displayed first image, information related to the zoom magnification, the resolution size of the displayed first image or a resolution size of the displayed cropped second image.

6. The mobile terminal of claim 2, wherein the control unit is further configured to control the memory to store the cropped second image such that the displayed cropped second image is distinguishable from previously-stored non-cropped images.

7. The mobile terminal of claim 2, wherein:
the memory includes a plurality of storage spaces configured to store images having different resolution sizes; and
the control unit is further configured to control the memory to store the displayed cropped second image in one of the plurality of storage spaces corresponding to a resolution size of the displayed cropped second image.

8. The mobile terminal of claim 2, wherein an amount of memory required to store the displayed cropped second image is less than an amount of memory that would be required to store the displayed first image before the zoom magnification was changed.

9. The mobile terminal of claim 1, wherein the displayed first information has a shape indicating an outline of the identified region.

10. The mobile terminal of claim 1, wherein the control unit is further configured to display the cropped second image in response to selection of the displayed first information.

11. The mobile terminal of claim 1, wherein the control unit is further configured to control the display unit to display a preview of an image of the identified region on a background of the displayed second information.

12. The mobile terminal of claim 1, wherein the displayed second information has a size that is based on the resolution size of the identified region.

13. The mobile terminal of claim 12, wherein the control unit is further configured to:
control the display unit to display the second information as a larger size when the resolution size of the identified region is increased; and
control the display unit to display the second information as a smaller size when the resolution size of the identified region is decreased.

14. The mobile terminal of claim 1, wherein the control unit is further configured to control the display unit to display the cropped second image as a full-screen image.

15. The mobile terminal of claim 1, further comprising an audio output unit, wherein the control unit is further configured to control the audio output unit to output a sound indicating the resolution size of the identified region.

16. A method of controlling a mobile terminal, the method comprising:
displaying a first image that is input via a camera having a zoom function with a corresponding zoom magnification;
processing a received command to change a zoom magnification applied to the displayed first image;
identifying a region within the displayed first image corresponding to a second image to which the changed zoom magnification is applied;
displaying first information indicating the identified region;
processing a received command to photograph the second image;
cropping the second image from the displayed first image;
displaying the cropped second image indicating a resolution size of the identified region in response to selection of displayed second information and according to a second scheme;
displaying at least a zoom magnification value of the cropped second image, a resolution size of the displayed first image or a resolution size of the identified region in response to selection of the displayed second information and according to a first scheme that is different from the second scheme; and displaying the first information and the second information transparently within the first image wherein the first scheme comprises a user touch to the input unit corresponding to the displayed first information for a duration that is less than a threshold time, and wherein the second scheme comprises a user touch to the input unit corresponding to the displayed second information for a duration that is greater than the threshold time.

* * * * *